(12) United States Patent
Tan (10) Patent No.: US 10,536,730 B2
(45) Date of Patent: Jan. 14, 2020

(54) METHOD FOR PROCESSING VIDEO FRAMES, VIDEO PROCESSING CHIP, AND MOTION ESTIMATION/MOTION COMPENSATION MEMC CHIP

(71) Applicant: Huawei Technologies Co., Ltd., Shenzhen (CN)

(72) Inventor: Lijuan Tan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/640,658

(22) Filed: Jul. 3, 2017

(65) Prior Publication Data

US 2017/0302973 A1 Oct. 19, 2017

Related U.S. Application Data

(63) Continuation of application No. PCT/CN2015/098760, filed on Dec. 24, 2015.

(30) Foreign Application Priority Data

Jan. 4, 2015 (CN) .......................... 2015 1 0003855

(51) Int. Cl.
*H04N 21/2343* (2011.01)
*H04N 21/4402* (2011.01)
*H04N 7/01* (2006.01)

(52) U.S. Cl.
CPC ....... *H04N 21/2343* (2013.01); *H04N 7/0117* (2013.01); *H04N 7/0135* (2013.01); *H04N 21/4402* (2013.01)

(58) Field of Classification Search
None
See application file for complete search history.

(56) References Cited

U.S. PATENT DOCUMENTS 6,014,694 A 1/2000 Aharoni et al.
2007/0242080 A1 10/2007 Hamada et al.
(Continued)

FOREIGN PATENT DOCUMENTS

CN 101646052 A 2/2010
CN 102760463 A 10/2012
(Continued)

OTHER PUBLICATIONS

Swan et al., "drawings related to the U.S. Appl. No. 13/216,747 published as US20130050572A1 on Feb. 28, 2013", Jul. 5, 2013, XP055417329, 8 pages.
(Continued)

*Primary Examiner* — Samira Monshi
(74) *Attorney, Agent, or Firm* — Slater Matsil, LLP (57) ABSTRACT

A method for processing video frames, a video processing chip, and a Motion Estimation/Motion Compensation (MEMC) chip are provided. The method performed by the video processing chip includes obtaining multiple video frames and adjusting each video frame from a first resolution to a second resolution. The method also includes inserting at least one invalid frame into the multiple video frames according to a second frame rate, so that a frame rate of a transport frame stream is the second frame rate; and sending the transport frame stream to an MEMC chip. The video processing chip and the MEMC chip may perform transmission of a frame stream according to an interface frequency corresponding to a resolution and a frame rate that are agreed upon.

17 Claims, 4 Drawing Sheets

(56) References Cited

U.S. PATENT DOCUMENTS

| | | |
|---|---|---|
| 2009/0051819 A1 | 2/2009 | Hasegawa |
| 2009/0161010 A1* | 6/2009 | Tran ................... H04N 7/014 |
| | | 348/441 |
| 2010/0033630 A1 | 2/2010 | Liang et al. |
| 2010/0091111 A1 | 4/2010 | Kang |
| 2011/0080503 A1* | 4/2011 | Okada ................... H04N 5/345 |
| | | 348/234 |
| 2013/0050572 A1 | 2/2013 | Swan et al. |
| 2014/0348246 A1 | 11/2014 | Fu et al. |

FOREIGN PATENT DOCUMENTS

| | | |
|---|---|---|
| CN | 103220550 A | 7/2013 |
| EP | 0992160 A1 | 4/2000 |
| KR | 20100046400 A | 5/2010 |

OTHER PUBLICATIONS

U.S. Appl. No. 13/216,747.

* cited by examiner

FIG. 7

METHOD FOR PROCESSING VIDEO FRAMES, VIDEO PROCESSING CHIP, AND MOTION ESTIMATION/MOTION COMPENSATION MEMC CHIP

CROSS-REFERENCE TO RELATED APPLICATIONS

This application is a continuation of International Application No. PCT/CN2015/098760, filed on Dec. 24, 2015, which claims priority to Chinese Patent Application No. 201510003855.4, filed on Jan. 4, 2015. The disclosures of the aforementioned applications are hereby incorporated by reference in their entireties.

TECHNICAL FIELD

The present invention relates to multimedia technologies, and in particular, to a method for processing video frames, a video processing chip, and an MEMC chip.

BACKGROUND

An existing terminal device, such as a television or a mobile phone, usually uses a Motion Estimation/Motion Compensation (MEMC) technology to improve video playing smoothness and therefore enhance user experience in viewing videos. The terminal device generally includes a video processing chip, an MEMC chip, and a display screen. The video processing chip is configured to decode a received bitstream to obtain video frames. The MEMC chip is configured to perform Motion Estimation/Motion Compensation on the received video frames to increase a frame rate of the video frames. The display screen is configured to display the video frames received from the MEMC chip.

Because the frame rate of the video frames obtained by the video processing chip is usually lower than a refresh rate of the display screen, the MEMC chip performs Motion Estimation/Motion Compensation on the video frames of a lower frame rate output by the video processing chip to output video frames of a higher frame rate, thereby meeting a requirement on the refresh rate of the display screen.

The following technical problems exist in the foregoing prior art: Because video frames obtained by a video processing chip are original video frames, if a frame rate or a resolution of the original video frames changes, the frame rate or the resolution of the video frames transmitted from the video processing chip to an MEMC chip changes accordingly. A correspondence among a frame rate, a resolution, and an interface frequency is agreed upon between the video processing chip and the MEMC chip. For example, when the resolution is full high definition (FHD) and the frame rate is 30 fps, the interface frequency between the video processing chip and the MEMC is 74.25 MHz; and when the resolution is ultra high definition (UHD) and the frame rate is 60 fps, the interface frequency between the video processing chip and the MEMC is 297 MHz. Therefore, when the frame rate or the resolution of the video frames transmitted from the video processing chip to the MEMC chip changes, the interface frequency between the video processing chip and the MEMC chip needs to be adjusted, that is, an interface time sequence is to be adjusted. However, this results in a temporary black screen on a display screen and therefore reduces smoothness of video playing on the display screen.

SUMMARY

Embodiments of the present invention provide a method for processing video frames, a video processing chip, and a Motion Estimation/Motion Compensation (MEMC) chip. Between the video processing chip and the MEMC chip, transmission of a frame stream is performed according to a fixed interface frequency to improve smoothness of video playing on a display screen.

To achieve the foregoing objective, the following technical solutions are used in the embodiments of the present invention.

According to a first aspect, the present embodiments provides a method for processing video frames, where the method includes obtaining, by a video processing chip, multiple video frames, where a frame rate of the multiple video frames is a first frame rate, and a resolution of the multiple video frames is a first resolution, and the first resolution is an original resolution of each video frame. The method also includes adjusting, by the video processing chip, each video frame from the first resolution to a second resolution, where the second resolution is a resolution agreed upon in advance by the video processing chip and an MEMC chip, and the second resolution is higher than the first resolution. Additionally, the method includes inserting, by the video processing chip according to a second frame rate, at least one invalid frame into the multiple video frames, so that a frame rate of a transport frame stream that consists of the multiple video frames and the at least one invalid frame is the second frame rate, and sending the transport frame stream to the MEMC chip, where the second frame rate is a frame rate agreed upon in advance by the video processing chip and the MEMC chip, and a resolution of the at least one invalid frame is the second resolution.

With reference to the first aspect, in a first possible implementation manner, the method further includes: sending, by the video processing chip, agreement information to the MEMC chip, where the agreement information includes the second frame rate, the second resolution, and location information, and the location information is used to indicate a location of a pixel region consisting of all pixels of each video frame at the first resolution in a pixel region consisting of all pixels of each video frame at the second resolution.

With reference to the first possible implementation manner of the first aspect, in a second possible implementation manner, the pixel region consisting of all pixels of each video frame at the first resolution is a first pixel region, the pixel region consisting of all pixels of each video frame at the second resolution is a second pixel region, and that the video processing chip adjusts each video frame from the first resolution to the second resolution includes: adding, for each video frame by the video processing chip, a padded pixel region in addition to the first pixel region according to the location information to form the second pixel region that includes the first pixel region and the padded pixel region.

With reference to the first aspect, or the first or the second possible implementation manner of the first aspect, in a third possible implementation manner, before the video processing chip inserts at least one invalid frame into the multiple video frames according to the second frame rate, the method further includes: generating, by the video processing chip, the at least one invalid frame.

With reference to the third possible implementation manner of the first aspect, in a fourth possible implementation manner, after the video processing chip generates the at least one invalid frame, the method further includes: setting, by the video processing chip, an invalidity marker for each invalid frame, where the invalidity marker is used to mark each invalid frame.

With reference to the first aspect, or the first, the second, the third or the fourth possible implementation manner of the first aspect, in a fifth possible implementation manner, the second resolution is the same as a resolution of a display screen, where the display screen is configured to display a frame stream processed by the video processing chip and the MEMC chip.

With reference to the first aspect, or the first, the second, the third, the fourth or the fifth possible implementation manner of the first aspect, in a sixth possible implementation manner, each invalid frame is a replicate frame of one video frame of the multiple video frames.

According to a second aspect, the present embodiments provide another method for processing video frames, where the method includes receiving, by an MEMC chip, a transport frame stream sent at a second frame rate by a video processing chip, where the transport frame stream includes multiple video frames and at least one invalid frame, a resolution of the multiple video frames and the at least one invalid frame is a second resolution, and the second frame rate and the second resolution are respectively a frame rate and a resolution that are agreed upon in advance by the video processing chip and the MEMC chip. The method also includes obtaining, by the MEMC chip, the multiple video frames in the transport frame stream, where a frame rate of the obtained multiple video frames is a first frame rate. Additionally, the method includes performing, by the MEMC chip, Motion Estimation/Motion Compensation on the multiple video frames of the first frame rate to generate a display frame stream of a third frame rate, where the third frame rate satisfies a refresh rate required for a display screen to display the display frame stream, and the third frame rate is higher than the first frame rate.

With reference to the second aspect, in a first possible implementation manner, before the MEMC chip receives the transport frame stream sent at the second frame rate by the video processing chip, the method further includes: receiving, by the MEMC chip, agreement information sent by the video processing chip, where the agreement information includes the second frame rate, the second resolution, and location information, the location information is used to indicate a location of a pixel region consisting of all pixels of each video frame at a first resolution in a pixel region consisting of all pixels of each video frame at the second resolution, the first resolution is an original resolution of each video frame, and the second resolution is higher than the first resolution.

With reference to the first possible implementation manner of the second aspect, in a second possible implementation manner, the pixel region consisting of all pixels of each video frame at the first resolution is a first pixel region, and the pixel region consisting of all pixels of each video frame at the second resolution is a second pixel region; and before the MEMC chip performs Motion Estimation/Motion Compensation on the multiple video frames of the first frame rate to generate the display frame stream of the third frame rate, the method further includes: obtaining, for each video frame by the MEMC chip, the first pixel region from the second pixel region according to the location information; and after the MEMC chip performs Motion Estimation/Motion Compensation on the multiple video frames of the first frame rate to generate the display frame stream of the third frame rate, the method further includes: increasing, by the MEMC chip, a resolution of each frame in the display frame stream to a third resolution, where the third resolution is a resolution of the display screen, and the third resolution is higher than the first resolution.

With reference to the second aspect, or the first or the second possible implementation manner of the second aspect, in a third possible implementation manner, each invalid frame includes an invalidity marker, and the obtaining, by the MEMC chip, the multiple video frames in the transport frame stream includes: obtaining, by the MEMC chip, the multiple video frames in the transport frame stream according to the invalidity marker of each invalid frame in the transport frame stream.

With reference to the second aspect, or the first, the second or the third possible implementation manner of the second aspect, in a fourth possible implementation manner, each invalid frame is a replicate frame of one video frame of the multiple video frames.

With reference to the second possible implementation manner of the second aspect, in a fifth possible implementation manner, after the MEMC chip increases the resolution of each frame in the display frame stream to the third resolution, the method further includes: sending, by the MEMC chip, the resolution-increased display frame stream to the display screen.

According to a third aspect, the present embodiments provide a video processing chip, where the video processing chip includes: a video frame obtaining module, configured to obtain multiple video frames and send the multiple video frames to a first video processing engine, where a frame rate of the multiple video frames is a first frame rate, a resolution of the multiple video frames is a first resolution, and the first resolution is an original resolution of each video frame; the first video processing engine, configured to: receive the multiple video frames sent by the video frame obtaining module; adjust each video frame from the first resolution to a second resolution, where the second resolution is a resolution agreed upon in advance by the video processing chip and an MEMC chip, and the second resolution is higher than the first resolution; insert, according to a second frame rate, at least one invalid frame into the multiple video frames, so that a frame rate of a transport frame stream that consists of the multiple video frames and the at least one invalid frame is the second frame rate, where the second frame rate is a frame rate agreed upon in advance by the video processing chip and the MEMC chip, and a resolution of the at least one invalid frame is the second resolution; and send the transport frame stream to a first video output interface; and the first video output interface, configured to receive the transport frame stream sent by the first video processing engine and send the transport frame stream to the MEMC chip.

With reference to the third aspect, in a first possible implementation manner, the video processing chip further includes: a first information agreement interface, configured to send agreement information to the MEMC chip, where the agreement information includes the second frame rate, the second resolution, and location information, and the location information is used to indicate a location of a pixel region consisting of all pixels of each video frame at the first resolution in a pixel region consisting of all pixels of each video frame at the second resolution.

With reference to the first possible implementation manner of the third aspect, in a second possible implementation manner, the pixel region consisting of all pixels of each video frame at the first resolution is a first pixel region, and the pixel region consisting of all pixels of each video frame at the second resolution is a second pixel region, and the first video processing engine is specifically configured to: add, for each video frame, a padded pixel region in addition to the first pixel region according to the location information to form the second pixel region that includes the first pixel region and the padded pixel region.

With reference to the third aspect, or the first or the second possible implementation manner of the third aspect, in a third possible implementation manner, the first video processing engine is further configured to: generate at least one invalid frame.

With reference to the third possible implementation manner of the third aspect, in a fourth possible implementation manner, the first video processing engine is further configured to: set an invalidity marker for each invalid frame, where the invalidity marker is used to mark each invalid frame.

According to a fourth aspect, the present embodiments provide an MEMC chip, where the MEMC chip includes: a video input interface, configured to receive a transport frame stream sent at a second frame rate by a video processing chip and send the transport frame stream to a second video processing engine, where the transport frame stream includes multiple video frames and at least one invalid frame, a resolution of the multiple video frames and the at least one invalid frame is a second resolution, and the second frame rate and the second resolution are respectively a frame rate and a resolution that are agreed upon in advance by the video processing chip and the MEMC chip; the second video processing engine, configured to obtain the multiple video frames in the transport frame stream, where a frame rate of the multiple video frames is a first frame rate, and send the multiple video frames to an MEMC processing engine; and the MEMC processing engine, configured to perform Motion Estimation/Motion Compensation on the multiple video frames of the first frame rate to generate a display frame stream of a third frame rate, where the third frame rate satisfies a refresh rate required for a display screen to display the display frame stream, and the third frame rate is higher than the first frame rate.

With reference to the fourth aspect, in a first possible implementation manner, the MEMC chip further includes: a second information agreement interface, configured to receive agreement information sent by the video processing chip, where the agreement information includes the second frame rate, the second resolution, and location information, the location information is used to indicate a location of a pixel region consisting of all pixels of each video frame at a first resolution in a pixel region consisting of all pixels of each video frame at the second resolution, the first resolution is an original resolution of each video frame, and the second resolution is higher than the first resolution.

With reference to the first possible implementation manner of the fourth aspect, in a second possible implementation manner, the pixel region consisting of all pixels of each video frame at the first resolution is a first pixel region, and the pixel region consisting of all pixels of each video frame at the second resolution is a second pixel region, and the second video processing engine is further configured to: obtain, for each video frame, the first pixel region from the second pixel region according to the location information; and receive the display frame stream sent by the MEMC processing engine, increase a resolution of each frame in the display frame stream to a third resolution, and send the resolution-increased display frame stream to a second video output interface, where the third resolution is a resolution of the display screen, and the third resolution is higher than the first resolution; and the MEMC processing engine is further configured to send the generated display frame stream to the second video processing engine.

With reference to the fourth aspect, or the first or the second possible implementation manner of the fourth aspect, in a third possible implementation manner, the MEMC processing engine is specifically configured to: obtain the multiple video frames in the transport frame stream according to an invalidity marker of each invalid frame in the transport frame stream.

With reference to the second possible implementation manner of the fourth aspect, the MEMC processing engine further includes: the second video output interface, configured to receive the resolution-increased display frame stream sent by the second video processing engine, and send the resolution-increased display frame stream to the display screen.

According to a fifth aspect, the present embodiments provide a terminal device, including: a video processing chip, configured to: obtain multiple video frames, where a frame rate of the multiple video frames is a first frame rate, a resolution of the multiple video frames is a first resolution, and the first resolution is an original resolution of each video frame; adjust each video frame from the first resolution to a second resolution, where the second resolution is a resolution agreed upon in advance by the video processing chip and an MEMC chip, and the second resolution is higher than the first resolution; insert, according to a second frame rate, at least one invalid frame into the multiple video frames, so that a frame rate of a transport frame stream that consists of the multiple video frames and the at least one invalid frame is the second frame rate, where the second frame rate is a frame rate agreed upon in advance by the video processing chip and the MEMC chip, and a resolution of the at least one invalid frame is the second resolution; and send the transport frame stream to the MEMC chip; the MEMC chip, configured to: receive the transport frame stream sent at the second frame rate by the video processing chip; obtain the multiple video frames in the transport frame stream, where a frame rate of the obtained multiple video frames is the first frame rate; perform Motion Estimation/Motion Compensation on the multiple video frames of the first frame rate to generate a display frame stream of a third frame rate, where the third frame rate satisfies a refresh rate required for a display screen to display the display frame stream, and the third frame rate is higher than the first frame rate; and send the display frame stream to the display screen; and the display screen, configured to receive and display the display frame stream output by the MEMC chip.

In the method for processing video frames provided in the embodiments of the present invention, because a video processing chip sends a transport frame stream to an MEMC chip according to a resolution and a frame rate that are agreed upon in advance, and the agreed resolution and frame rate correspond to a fixed interface frequency, the video processing chip and the MEMC chip may perform transmission of a frame stream according to the fixed interface frequency. Even when a resolution and a frame rate of video frames obtained by the video processing chip change, there is no need to adjust the interface frequency between the video processing chip and the MEMC chip. This does not result in a black screen on a display screen and therefore improves smoothness of video playing on the display screen.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present embodiments.

Figure 1:
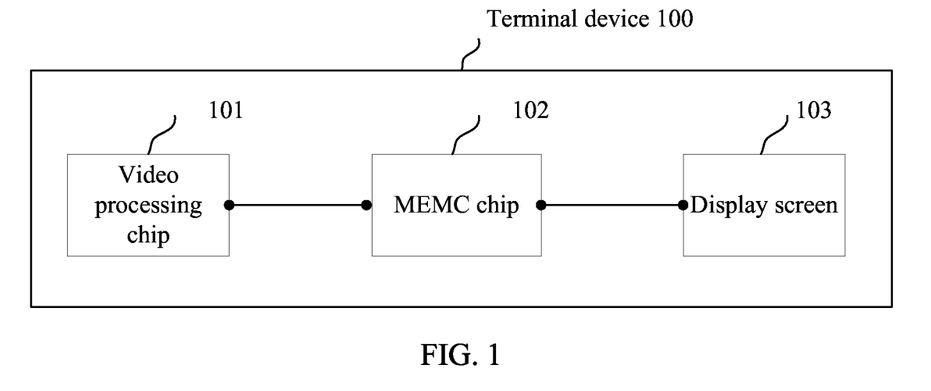
FIG. 1 is a structure of a terminal device according to an embodiment of the present invention.

FIG. 1 describes a structure of a terminal device involved in the present embodiments. The terminal device 100 includes a video processing chip 101, a Motion Estimation/Motion Compensation (MEMC) chip 102, and a display screen 103. The terminal device 100 is a device that has video processing and displaying capabilities, for example, a television or a mobile phone. The video processing chip 101 and the MEMC chip 102 may be two independent chips, or two modules in an integrated chip. Generally, the video processing chip 101 may be understood as a main chip of the terminal device 100.

With reference to FIG. 1, an overall idea of the technical solutions involved in the present embodiments is described as follows: After obtaining original video frames, the video processing chip 101 adjusts a resolution and a frame rate of the original video frames according to a resolution and a frame rate that are agreed upon in advance with the MEMC chip 102, and sends the adjusted video frames to the MEMC chip 102. The MEMC chip 102 performs Motion Estimation/Motion Compensation and related processing on the received video frames and then sends the video frames to the display screen 103. The display screen 103 completes video displaying.

To better understand the foregoing technical solution, the following describes the technical solution in detail with reference to specific embodiments.

Figure 2:
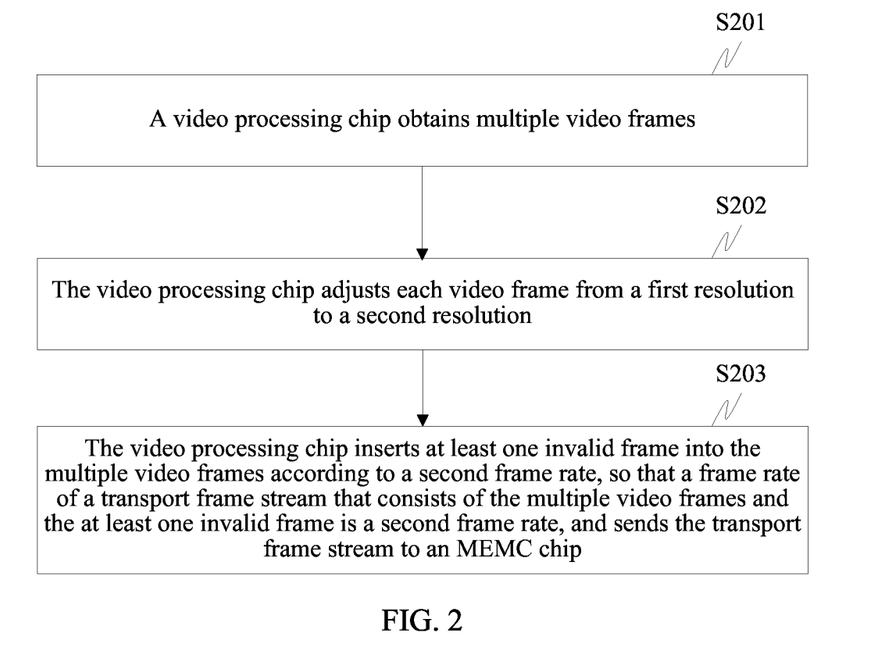
FIG. 2 is a flowchart of a method for processing video frames according to an embodiment of the present invention.

FIG. 2 describes a method for processing video frames according to an embodiment of the present invention. This embodiment is executed by a video processing chip. The method for processing video frames includes the following steps.

S201: The video processing chip obtains multiple video frames.

A frame rate of the multiple video frames is a first frame rate, a resolution of the multiple video frames is a first resolution, and the first resolution is an original resolution of each video frame.

Specifically, the video processing chip decodes an input video signal received on a network interface or a digital radio frequency interface to obtain the multiple video frames, or the video processing chip directly receives the multiple video frames by using a video input interface. The video input interface may be specifically a Video Graphics Array (VGA) interface or a High Definition Multimedia Interface (HDMI), or the like.

It should be noted that, after obtaining the multiple video frames, the video processing chip may directly perform the following resolution adjustment and frame rate changing on the multiple video frames, or may first perform noise reduction on the multiple video frames and then perform the following resolution adjustment and frame rate changing on the noise-reduced multiple video frames. In the present embodiments, whether the multiple video frames are processed by means of noise reduction is not limited, provided that the multiple video frames are original video frames. Pixel information of the multiple video frames at the first resolution is original pixel information.

S202: The video processing chip adjusts each video frame from a first resolution to a second resolution.

The second resolution is a resolution agreed upon in advance by the video processing chip and the MEMC chip, and the second resolution is higher than the first resolution.

Because the second resolution is a resolution agreed upon in advance by the video processing chip and the MEMC chip, before the video processing chip adjusts each video frame from the first resolution to the second resolution, the video processing chip needs to send agreement information to the MEMC chip. The agreement information includes the second resolution.

Preferably, the second resolution is identical to a resolution of a display screen. The display screen is configured to display a frame stream resulting from processing by the video processing chip and the MEMC chip.

After the video processing chip adjusts each video frame from the first resolution to the second resolution, the video processing chip sends the resolution-adjusted multiple video frames to the MEMC chip. Therefore, after receiving the multiple video frames, the MEMC chip further needs to extract a pixel region consisting of all pixels corresponding to the first resolution from a pixel region consisting of all pixels corresponding to the second resolution for each video frame, to obtain the original pixel information of each video frame. Therefore, the agreement information includes location information in addition to the second resolution. The location information is used to indicate a location of the pixel region consisting of all pixels of each video frame at the first resolution in the pixel region consisting of all pixels of each video frame at the second resolution. The video processing chip adjusts each video frame from the first resolution to the second resolution according to the location information. The MEMC chip extracts the pixel region consisting of pixels corresponding to the first resolution from the pixel region consisting of all pixels corresponding to the second resolution for each video frame according to the location information.

Specifically, each video frame includes multiple pixels, the pixel region consisting of all pixels of each video frame at the first resolution is a first pixel region, and the pixel region consisting of all pixels of each video frame at the second resolution is a second pixel region. Therefore, that the video processing chip adjusts each video frame from the first resolution to the second resolution includes: adding, for each video frame by the video processing chip, a padded pixel region in addition to the first pixel region according to the location information to form the second pixel region that includes the first pixel region and the padded pixel region.

Figure 3A:
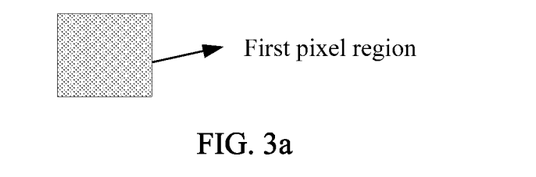
FIG. 3a is a pixel region of one video frame at a first resolution according to the present invention.
Figure 3B:
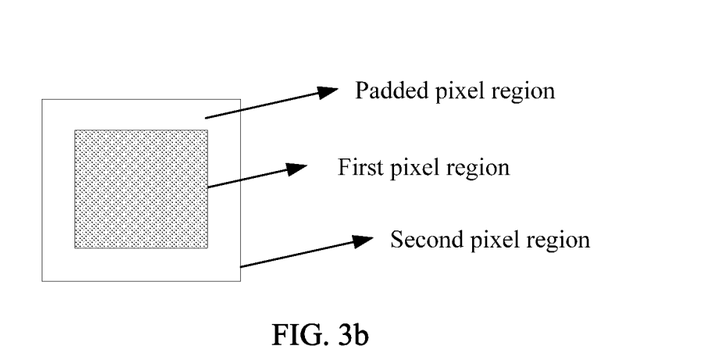
FIG. 3b is a pixel region of one video frame at a second resolution according to the present invention.

To facilitate understanding, FIG. 3a describes a pixel region consisting of all pixels of one video frame at a first resolution, that is, a first pixel region. FIG. 3b describes a pixel region consisting of all pixels of one video frame at a second resolution, that is, a second pixel region. It can be known from FIG. 3b that the second pixel region includes the first pixel region and a padded pixel region. The padded pixel region is unnecessarily distributed around the first pixel region for padding as shown in FIG. 3b, provided that the padded pixel region is outside the first pixel region. The padding manner described in FIG. 3b is merely an example. In addition, a pixel value of the padded pixel region is not limited in the present embodiments.

S203: The video processing chip inserts at least one invalid frame into the multiple video frames according to a second frame rate, so that a frame rate of a transport frame stream that consists of the multiple video frames and the at least one invalid frame is the second frame rate, and sends the transport frame stream to the MEMC chip.

The second frame rate is a frame rate agreed upon in advance by the video processing chip and the MEMC chip. Therefore, the foregoing agreement information sent by the video processing chip to the MEMC chip further includes the second frame rate, and the second frame rate is higher than the first frame rate. A unit of a frame rate is usually frame per second, that is, fps, which indicates a quantity of frames per unit time.

Because the second frame rate is higher than the first frame rate, the video processing chip needs to insert the at least one invalid frame into the multiple video frames, so that the frame rate of the transport frame stream output by the video processing chip is the second frame rate. Therefore, a function of the at least one invalid frame is to increase the frame rate of the transport frame stream output by the video processing chip to the MEMC chip to reach the second frame rate agreed upon in advance. Further, before inserting the at least one invalid frame into the multiple video frames according to the second frame rate, the video processing chip generates the at least one invalid frame. Further, the MEMC chip needs to identify the invalid frame in the transport frame stream after receiving the transport frame stream. Therefore, after generating the at least one invalid frame, the video processing chip needs to set an invalidity marker for each invalid frame, and the invalidity marker is used to identify each invalid frame.

In the present embodiments, a function of an invalid frame is to increase a frame rate. In addition, after subsequently receiving the transport frame stream that consists of the multiple video frames and the invalid frame, the MEMC chip only needs to obtain the multiple video frames in the transport frame stream. Therefore, data information included in the invalid frame is not limited in the present embodiments, and any frame that can increase the frame rate belongs to the scope of invalid frames.

Preferably, each invalid frame may be a replicate frame of one video frame of the multiple video frames. Accordingly, an invalidity marker of each invalid frame is a replication marker to mark that the invalid frame is a replicate frame. It should be noted that, because a resolution of each frame in the transport frame stream that is transmitted by the video processing chip to the MEMC chip needs to be the second resolution agreed upon in advance, a resolution of the at least one invalid frame also needs to be the second resolution.

In the method for processing video frames provided in this embodiment, because the video processing chip sends a transport frame stream to an MEMC chip according to a resolution and a frame rate that are agreed upon in advance, and the agreed resolution and frame rate correspond to a fixed interface frequency, the video processing chip and the MEMC chip may perform transmission of a frame stream according to the fixed interface frequency. Even when a resolution and a frame rate of video frames obtained by the video processing chip change, there is no need to adjust the interface frequency between the video processing chip and the MEMC chip. This does not result in a black screen on a display screen and therefore improves smoothness of video playing on the display screen.

Figure 4:
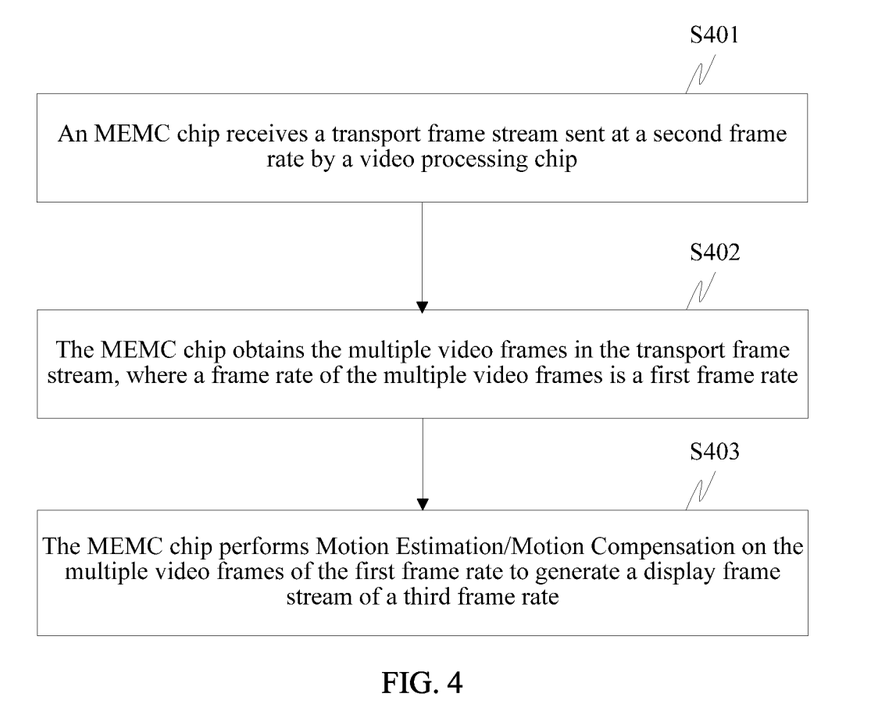
FIG. 4 is a flowchart of a method for processing video frames according to another embodiment of the present invention.

FIG. 4 describes a method for processing video frames according to another embodiment of the present invention. This embodiment is executed by an MEMC chip. The method for processing video frames includes the following steps.

S401: The MEMC chip receives a transport frame stream sent at a second frame rate by the video processing chip.

The transport frame stream includes multiple video frames and at least one invalid frame. A resolution of the multiple video frames and the at least one invalid frame is a second resolution. The second frame rate and the second resolution are respectively a frame rate and a resolution that are agreed upon in advance by the video processing chip and the MEMC chip.

Because the second frame rate and the second resolution are respectively the frame rate and the resolution that are agreed upon in advance by the video processing chip and the MEMC chip, before the MEMC chip receives the transport frame stream sent at the second frame rate by the video processing chip, the method for processing video frames further includes: receiving, by the MEMC chip, agreement information sent by the video processing chip. The agreement information includes the second frame rate, the second resolution, and location information. A first resolution is an original resolution of each video frame, and the second resolution is higher than the first resolution. The location information is used to indicate a location of a pixel region consisting of all pixels of each video frame at the first resolution in a pixel region consisting of all pixels of each video frame at the second resolution.

Because the video processing chip and the MEMC chip have agreed upon the second frame rate and the second resolution, the MEMC chip receives the transport frame stream sent at the second frame rate by the video processing chip according to an interface frequency corresponding to the second frame rate and the second resolution.

S402: The MEMC chip obtains multiple video frames in the transport frame stream, where a frame rate of the multiple video frames is a first frame rate.

Each invalid frame in the transport frame stream is marked with an invalidity marker, and the invalidity marker can identify each invalid frame. Therefore, the MEMC chip can obtain the multiple video frames in the transport frame stream according to the invalidity marker of each invalid frame in the transport frame stream.

It can be known from the embodiment described in FIG. 2 that the frame rate of the multiple video frames is the first frame rate. Therefore, the frame rate of the multiple video frames obtained from the transport stream by the MEMC chip is the first frame rate.

Preferably, each invalid frame may be a replicate frame of one video frame of the multiple video frames, and the invalidity marker of each invalid frame is a replication marker to mark that the invalid frame is a replicate frame. Then, the MEMC chip can obtain the multiple video frames in the transport frame stream according to the invalidity marker of each replicate frame in the transport frame stream.

S403: The MEMC chip performs Motion Estimation/Motion Compensation on the multiple video frames of the first frame rate to generate a display frame stream of a third frame rate.

The third frame rate satisfies a refresh rate required for a display screen to display the display frame stream, and the third frame rate is higher than the first frame rate.

Specifically, by using an MEMC technology, the MEMC chip inserts a motion compensation frame between two frames of the multiple video frames to generate the display frame stream of the third frame rate. Since the MEMC technology is a prior art, the present embodiments do not provide further descriptions about a specific procedure in which the MEMC chip performs Motion Estimation/Motion Compensation on the multiple video frames of the first frame rate to generate the display frame stream of the third frame rate.

Further, after obtaining the multiple video frames and before performing Motion Estimation/Motion Compensation on the multiple video frames of the first frame rate, the MEMC chip extracts the pixel region consisting of all pixels corresponding to the first resolution from the pixel region consisting of all pixels corresponding to the second resolution for each video frame, to obtain original pixel information of each video frame. In addition, after performing Motion Estimation/Motion Compensation on the multiple video frames of the first frame rate, the MEMC chip increases a resolution of each frame in the display frame stream to a third resolution. The third resolution is higher than the first resolution, and the third resolution is a resolution of the display screen. Specific details are as follows.

The agreement information received by the MEMC chip includes the location information, and the location information is used to indicate the location of the pixel region consisting of all pixels of each video frame at the first resolution in the pixel region consisting of all pixels of each video frame at the second resolution. The pixel region consisting of all pixels of each video frame at the first resolution is a first pixel region, and the pixel region consisting of all pixels of each video frame at the second resolution is a second pixel region. The second pixel region includes the first pixel region and a padded pixel region. For details, refer to FIG. 3a and FIG. 3b.

After obtaining the multiple video frames at the second resolution, the MEMC chip extracts the pixel region consisting of all pixels corresponding to the first resolution from the pixel region consisting of all pixels corresponding to the second resolution for each video frame, to obtain the original pixel information of each video frame. Specifically, for each video frame, the MEMC chip obtains the first pixel region from the second pixel region according to the location information. A video frame consisting of a first pixel region is a video frame at the first resolution, that is, an original video frame.

After Motion Estimation/Motion Compensation is performed on the multiple video frames of the first frame rate, a resolution of each frame in the display frame stream is the first resolution. The MEMC chip further needs to increase the resolution of each frame to the third resolution. Specifically, the MEMC chip extends the first pixel region corresponding to each frame in the display frame stream to a third pixel region corresponding to the third resolution. A video frame consisting of a third pixel region is a video frame at the third resolution.

It should be noted that, in the present embodiments, an implementation manner for extending the first pixel region to the third pixel region is different from an implementation manner for adjusting the first pixel region to the second pixel region. Extending the first pixel region to the third pixel region is generating, by means of an interpolation operation, new pixel values from pixel values in the first pixel region for pixel region extension. The newly-generated pixel values are related to the pixel values in the first pixel region. However, adjusting the first pixel region to the second pixel region is padding pixel values outside the first pixel region for pixel region extension. The padded pixel values are not related to pixel values in the first pixel region.

Further, after increasing the resolution of each frame in the display frame stream to the third resolution, the MEMC chip sends the resolution-increased display frame stream to the display screen. After receiving the display frame stream, the display screen displays a video.

In the method for processing video frames provided in this embodiment, the MEMC chip receives a transport frame stream sent by a video processing chip according to an interface frequency corresponding to a resolution and a frame rate that are agreed upon in advance. When a resolution and a frame rate of video frames obtained by the video processing chip change, there is no need to adjust the interface frequency between the video processing chip and the MEMC chip. This does not result in a black screen on a display screen and therefore improves smoothness of video playing on the display screen.

Figure 5:
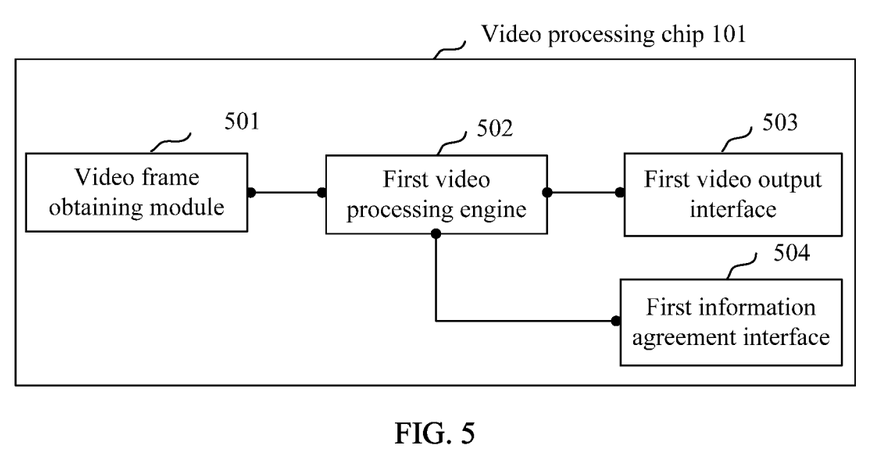
FIG. 5 is a structure of a video processing chip according to an embodiment of the present invention.
Figure 7:
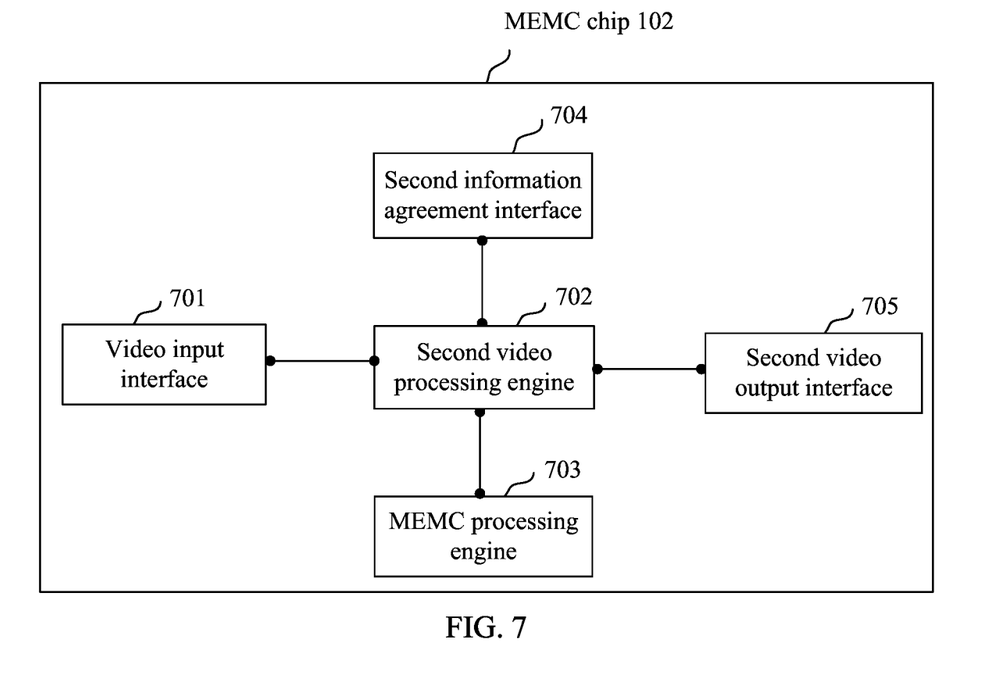
FIG. 7 is a structure of an MEMC chip according to an embodiment of the present invention.

With reference to FIG. 2 to FIG. 4, the foregoing describes in detail the method for processing video frames provided in the embodiments of the present invention. With reference to FIG. 5 to FIG. 7, the following describes in detail a video processing chip and an MEMC chip provided in the embodiments of the present invention.

FIG. 5 describes a structure of a video processing chip 101 according to an embodiment of the present invention. The video processing chip 101 includes a video frame obtaining module 501, a first video processing engine 502, and a first video output interface 503.

The video frame obtaining module 501 is configured to obtain multiple video frames. A frame rate of the multiple video frames is a first frame rate, and a resolution of the multiple video frames is a first resolution. The first resolution is an original resolution of each video frame. Specifically, a structure of the video frame obtaining module 501 may be shown in FIG. 6a or FIG. 6b.

Figure 6A:
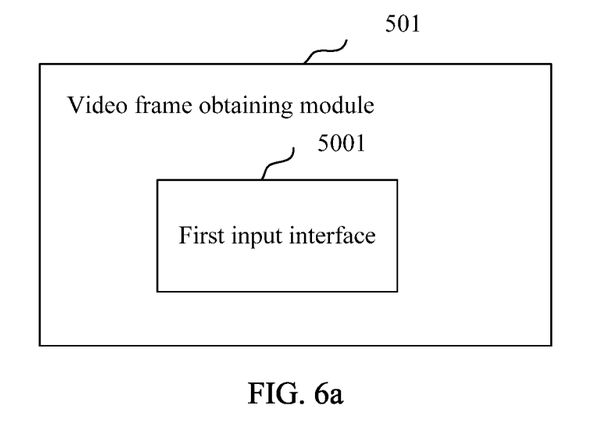
FIG. 6a is a structure of a video frame obtaining module in the structure of the video processing chip described in FIG. 5.

In FIG. 6a, the video frame obtaining module 501 includes a first input interface 5001. The first input interface 5001 may be a video input interface, such as a VGA or an HDMI interface. An input video signal received by the first input interface 5001 does not need to be decoded. In this case, the received input video signal is video frames.

Figure 6B:
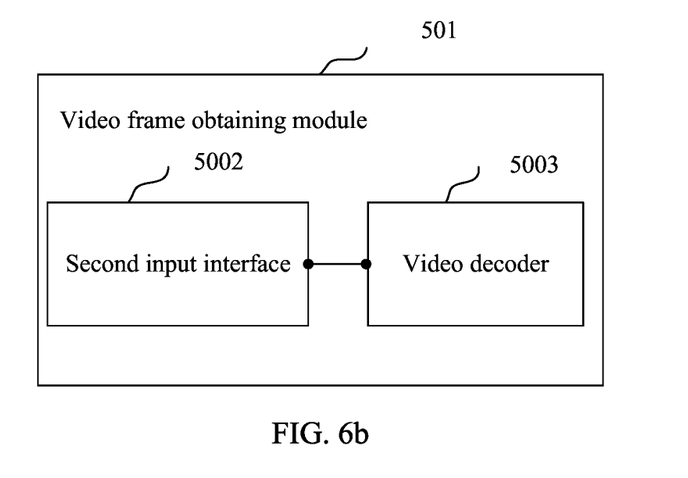
FIG. 6b is another structure of a video frame obtaining module in the structure of the video processing chip described in FIG. 5.

In FIG. 6b, the video frame obtaining module 501 includes a second input interface 5002 and a video decoder 5003. The second input interface 5002 is configured to receive an input video signal and send the received input video signal to the video decoder 5003. The video decoder 5003 is configured to decode the received input video signal to obtain multiple video frames. In this case, the second input interface 5002 is a network interface or a digital radio frequency interface. The input video signal received by the second input interface 5002 needs to be decoded to become original video frames.

After obtaining the multiple video frames, the video frame obtaining module 501 sends the multiple video frames to the first video processing engine 502.

The first video processing engine 502 is configured to: receive the multiple video frames sent by the video frame obtaining module 501; adjust each video frame from the first resolution to a second resolution after obtaining the multiple video frames, where the second resolution is a resolution agreed upon in advance by the video processing chip 101 and an MEMC chip, and the second resolution is higher than the first resolution; insert, according to a second frame rate, at least one invalid frame into the multiple video frames, so that a frame rate of a transport frame stream that consists of the multiple video frames and the at least one invalid frame is the second frame rate, where the second frame rate is a frame rate agreed upon in advance by the video processing chip and the MEMC chip, and a resolution of the at least one invalid frame is the second resolution; and send the transport frame stream to the first video output interface 503.

It should be noted that, after obtaining the multiple video frames, the first video processing engine 502 may directly perform resolution adjustment and frame rate changing on the multiple video frames, or may first perform noise reduction on the multiple video frames and then perform resolution adjustment and frame rate changing on the noise-reduced multiple video frames. In the present embodiments, whether the multiple video frames are processed by means of noise reduction is not limited, provided that the multiple video frames are original video frames.

The first video output interface 503 is configured to receive the transport frame stream sent by the first video processing engine 502 and send the transport frame stream to the MEMC chip. Specifically, the video output interface may be a low-voltage differential signaling (LVDS) interface or a V-by-One interface.

Further, the video processing chip 101 further includes: a first information agreement interface 504, configured to send agreement information to the MEMC chip, where the agreement information includes the second frame rate, the second resolution, and location information. The location information is used to indicate a location of a pixel region consisting of all pixels of each video frame at the first resolution in a pixel region consisting of all pixels of each video frame at the second resolution. Specifically, the first information agreement interface 504 may a vertical blanking interval (VBI) interface or a customized interface.

Accordingly, it is assumed that the pixel region consisting of all pixels of each video frame at the first resolution is a first pixel region, and that the pixel region consisting of all pixels of each video frame at the second resolution is a second pixel region, a specific implementation manner for resolution adjustment by the first video processing engine 502 is: adding, for each video frame, a padded pixel region in addition to the first pixel region according to the location information in the agreement information to form the second pixel region that includes the first pixel region and the padded pixel region.

Further, the first video processing engine 502 is configured to generate at least one invalid frame.

After generating the at least one invalid frame, the first video processing engine 502 sets an invalidity marker for each invalid frame. The invalidity marker is used to mark each invalid frame.

Preferably, each invalid frame may be a replicate frame of one video frame of the multiple video frames. Accordingly, an invalidity marker of each invalid frame is a replication marker to mark that the invalid frame is a replicate frame.

The video processing chip provided in this embodiment sends a transport frame stream to an MEMC chip according to a resolution and a frame rate that are agreed upon in advance, and the agreed resolution and frame rate correspond to a fixed interface frequency. Therefore, the video processing chip and the MEMC chip may perform transmission of a frame stream according to the fixed interface frequency. Even when a resolution and a frame rate of video frames obtained by the video processing chip change, there is no need to adjust the interface frequency between the video processing chip and the MEMC chip. This does not result in a black screen on a display screen and therefore improves smoothness of video playing on the display screen.

FIG. 7 describes a structure of an MEMC chip 102 according to another embodiment of the present invention. The MEMC chip 102 includes a video input interface 701, a second video processing engine 702, and an MEMC processing engine 703.

The video input interface 701 is configured to receive a transport frame stream sent at a second frame rate by a video processing chip and send the transport frame stream to the second video processing engine 702. The transport frame stream includes multiple video frames and at least one invalid frame, a resolution of the multiple video frames and the at least one invalid frame is a second resolution, and the second frame rate and the second resolution are respectively a frame rate and a resolution that are agreed upon in advance by the video processing chip and the MEMC chip 102.

The second video processing engine 702 is configured to obtain the multiple video frames in the transport frame stream sent by the video input interface 701, and send the multiple video frames to the MEMC processing engine 703. A frame rate of the multiple video frames is a first frame rate. Specifically, the second video processing engine 702 can obtain the multiple video frames in the transport frame stream according to an invalidity marker of each invalid frame in the transport frame stream.

The MEMC processing engine 703 is configured to perform Motion Estimation/Motion Compensation on the multiple video frames of the first frame rate to generate a display frame stream of a third frame rate. The third frame rate satisfies a refresh rate required for a display screen to display the display frame stream, and the third frame rate is higher than the first frame rate.

Further, the MEMC chip 102 further includes a second information agreement interface 704.

The second information agreement interface 704 is configured to receive agreement information sent by the video processing chip, where the agreement information includes the second frame rate, the second resolution, and location information. The location information is used to indicate a location of a pixel region consisting of all pixels of each video frame at a first resolution in a pixel region consisting of all pixels of each video frame at the second resolution. The first resolution is an original resolution of each video frame, and the second resolution is higher than the first resolution.

It is assumed that the pixel region consisting of all pixels of each video frame at the first resolution is a first pixel region, and that the pixel region consisting of all pixels of each video frame at the second resolution is a second pixel region. Then, after obtaining the multiple video frames in the transport frame stream, the second video processing engine 702 is further configured to: obtain, for each video frame, the first pixel region from the second pixel region according to the location information, that is, extract the pixel region consisting of all pixels corresponding to the first resolution from the pixel region consisting of all pixels corresponding to the second resolution, to obtain original pixel information of each video frame, and then send the resolution-decreased multiple video frames to the MEMC processing engine 703 for Motion Estimation/Motion Compensation; and receive the display frame stream sent by the MEMC processing engine 703, increase a resolution of each frame in the display frame stream to a third resolution, and send the resolution-increased display frame stream to a second video output interface 705. The third resolution is a resolution of the display screen, and the third resolution is higher than the first resolution.

Accordingly, the MEMC processing engine 703 is further configured to send the generated display frame stream to the second video processing engine 702. It should be noted that the second video processing engine 702 may not only increase the resolution of each frame in the display frame stream, but also perform image enhancement processing, for example, sharpening, on each frame in the display frame stream to enhance display quality of the display frame stream. Therefore, the display frame stream sent to the second video output interface 705 by the second video processing engine 702 may be processed by means of image enhancement. This is not limited in the present embodiments.

The MEMC chip 102 further includes the second video output interface 705.

The second video output interface 705 is configured to receive the resolution-increased display frame stream sent by the second video processing engine 702, and send the resolution-increased display frame stream to the display screen for video displaying.

The MEMC chip provided in this embodiment receives a transport frame stream sent by a video processing chip according to an interface frequency corresponding to a resolution and a frame rate that are agreed upon in advance. When a resolution and a frame rate of video frames obtained by the video processing chip change, there is no need to adjust the interface frequency between the video processing chip and the MEMC chip. This does not result in a black screen on a display screen and therefore improves smoothness of video playing on the display screen.

With reference to FIG. 1, an embodiment of the present invention provides a terminal device 100. The terminal device 100 includes a video processing chip 101, an MEMC chip 102, and a display screen 103.

The video processing chip 101 is configured to: obtain multiple video frames, where a frame rate of the multiple video frames is a first frame rate, a resolution of the multiple video frames is a first resolution, and the first resolution is an original resolution of each video frame; adjust each video frame from the first resolution to a second resolution, where the second resolution is a resolution agreed upon in advance by the video processing chip 101 and the MEMC chip 102, and the second resolution is higher than the first resolution; insert, according to a second frame rate, at least one invalid frame into the multiple video frames, so that a frame rate of a transport frame stream that consists of the multiple video frames and the at least one invalid frame is the second frame rate, where the second frame rate is a frame rate agreed upon in advance by the video processing chip 101 and the MEMC chip 102, and a resolution of the at least one invalid frame is the second resolution; and send the transport frame stream to the MEMC chip 102.

The MEMC chip 102 is configured to: receive the transport frame stream sent at the second frame rate by the video processing chip; obtain the multiple video frames in the transport frame stream, where a frame rate of the obtained multiple video frames is the first frame rate; perform Motion Estimation/Motion Compensation on the multiple video frames of the first frame rate to generate a display frame stream of a third frame rate, where the third frame rate satisfies a refresh rate required for the display screen to display the display frame stream, and the third frame rate is higher than the first frame rate; and send the display frame stream to the display screen 103.

The display screen 103 is configured to receive and display the display frame stream output by the MEMC chip 102.

For a specific structure of the video processing chip 101 and that of the MEMC chip 102, refer to the descriptions of the embodiment corresponding to FIG. 5 and the embodiment corresponding to FIG. 7 respectively. Details are not described herein again.

The foregoing video processing chip 101 and the MEMC chip 102 may be implemented by using digital logic circuits respectively. Each digital logic circuit is used to execute the method mentioned in the foregoing corresponding embodiment by means of a logic operation. Alternatively, either of the video processing chip 101 and the MEMC chip 102 may be implemented by using a general-purpose processor. The general-purpose processor performs a related processing method by executing a computer software program.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present embodiments.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present embodiments essentially, or the part contributing to the prior aft, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present embodiments, but are not intended to limit the protection scope of the present embodiments. Any variation or replacement readily figured out by a person skilled in the art within the technical scope disclosed in the present embodiments shall fall within the protection scope of the present embodiments. Therefore, the protection scope of the present embodiments shall be subject to the protection scope of the claims.

What is claimed is:

1. A method comprising:
   obtaining, by a video processing chip, multiple video frames, wherein a frame rate of the multiple video frames is a first frame rate, wherein a resolution of the multiple video frames is a first resolution, and wherein the first resolution is an original resolution of the multiple video frames;
   adjusting, by the video processing chip, the multiple video frames from the first resolution to a second resolution, wherein the second resolution is a resolution agreed upon in advance by the video processing chip and a Motion Estimation/Motion Compensation (MEMC) chip, and wherein the second resolution is higher than the first resolution;
   generating, by the video processing chip, at least one invalid frame;
   setting, by the video processing chip, an invalidity marker for the at least one invalid frame, wherein the invalidity marker marks the at least one invalid frame;
   inserting, by the video processing chip according to a second frame rate, the at least one invalid frame into the multiple video frames, causing a frame rate of a transport frame stream including the multiple video frames and the at least one invalid frame to be the second frame rate; and
   sending the transport frame stream to the MEMC chip, wherein a resolution of the at least one invalid frame is the second resolution, wherein the multiple video frames in the transport frame stream are obtainable by the MEMC chip according to the invalidity marker of the at least one invalid frame in the transport frame stream, to enable the MEMC chip to perform MEMC on the multiple video frames of the first frame rate, and wherein performing MEMC on the multiple video frames of the first frame rate enables the MEMC chip to generate a display frame stream of a third frame rate.

2. The method according to claim 1, wherein the method further comprises:
   sending, by the video processing chip, agreement information to the MEMC chip, wherein the agreement information comprises the second frame rate, the second resolution, and location information, and wherein the location information indicates a location of a first pixel region containing pixels of the multiple video frames at the first resolution in a second pixel region containing pixels of the multiple video frames at the second resolution.

3. The method according to claim 2, wherein adjusting the multiple video frames from the first resolution to the second resolution comprises:
   forming, by the video processing chip, a second pixel region by combining, according to the location information, a padded pixel region and the first pixel region.

4. The method according to claim 1, wherein the second resolution is identical to a resolution of a display screen, wherein the display screen is configured to display a frame stream processed by the video processing chip and the MEMC chip.

5. A method comprising:
   receiving, by a Motion Estimation/Motion Compensation (MEMC) chip, a transport frame stream sent at a second frame rate by a video processing chip, wherein the transport frame stream comprises multiple video frames and at least one invalid frame, wherein a resolution of the multiple video frames and the at least one invalid frame is a second resolution, and wherein the second frame rate is a frame rate agreed upon in advance by the video processing chip and the MEMC chip, and wherein the second resolution is a resolution agreed upon in advance by the video processing chip and the MEMC chip;
   obtaining, by the MEMC chip, the multiple video frames in the transport frame stream according to an invalidity marker of the at least one invalid frame in the transport frame stream, wherein a frame rate of the obtained multiple video frames is a first frame rate; and
   performing, by the MEMC chip, motion estimation or motion compensation on the multiple video frames of the first frame rate, to generate a display frame stream of a third frame rate, wherein the third frame rate satisfies a refresh rate for a display screen to display the display frame stream, and wherein the third frame rate is higher than the first frame rate.

6. The method according to claim 5, wherein the method further comprises:
   receiving, by the MEMC chip, agreement information sent by the video processing chip, before receiving the transport frame stream, wherein the agreement information comprises the second frame rate, the second resolution, and location information, wherein the location information indicates a location of a first pixel region containing pixels of the multiple video frames at a first resolution in a second pixel region containing pixels of the multiple video frames at the second resolution, wherein the first resolution is an original resolution of the multiple video frames, and wherein the second resolution is higher than the first resolution.

7. The method according to claim 6, wherein the method further comprises:
   obtaining, by the MEMC chip, the first pixel region from the second pixel region according to the location information, before performing motion estimation or motion compensation on the multiple video frames of the first frame rate; and increasing, by the MEMC chip, a resolution of the multiple video frames in the display frame stream to a third resolution, after performing motion estimation or motion compensation on the multiple video frames of the first frame rate, wherein the third resolution is a resolution of the display screen, and wherein the third resolution is higher than the first resolution.

8. The method according to claim 7, wherein the method further comprises:
sending, by the MEMC chip, the display frame stream to the display screen, after increasing the resolution of the multiple video frames in the display frame stream to the third resolution.

9. A video processing chip, comprising:
a processor; and
a non-transitory computer readable storage medium storing a program for execution by the processor, the program including instructions to:
obtain multiple video frames, wherein a frame rate of the multiple video frames is a first frame rate, wherein a resolution of the multiple video frames is a first resolution, and wherein the first resolution is an original resolution of the multiple video frames;
adjust the multiple video frames from the first resolution to a second resolution, wherein the second resolution is a resolution agreed upon in advance by the video processing chip and a Motion Estimation/Motion Compensation (MEMC) chip, and wherein the second resolution is higher than the first resolution;
generate at least one invalid frame;
set an invalidity marker for the at least one invalid frame, wherein the invalidity marker marks the at least one invalid frame;
insert, according to a second frame rate, the at least one invalid frame into the multiple video frames, causing a frame rate of a transport frame stream containing the multiple video frames and the at least one invalid frame to be the second frame rate, wherein the second frame rate is a frame rate agreed upon in advance by the video processing chip and the MEMC chip, and wherein a resolution of the at least one invalid frame is the second resolution; and
send the transport frame stream to the MEMC chip, wherein the multiple video frames are obtainable by the MEMC chip in the transport frame stream according to the invalidity marker of the at least one invalid frame in the transport frame stream, to enable the MEMC chip to perform MEMC on the multiple video frames of the first frame rate, and wherein Performing MEMC on the multiple video frames of the first frame rate enables the MEMC chip to generate a display frame stream of a third frame rate.

10. The video processing chip according to claim 9, wherein the instructions further comprise instructions to:
send agreement information to the MEMC chip, wherein the agreement information comprises the second frame rate, the second resolution, and location information, and wherein the location information indicates a location of a first pixel region containing pixels of the multiple video frames at the first resolution in a second pixel region containing pixels of the multiple video frames at the second resolution.

11. The video processing chip according to claim 10, wherein the instructions further comprise instructions to:
form a second pixel region by combining, according to the location information, a padded pixel region and the first pixel region.

12. A Motion Estimation/Motion Compensation (MEMC) chip, comprising:
a processor; and
a non-transitory computer readable storage medium storing a program for execution by the processor, the program including instructions to:
receive a transport frame stream sent at a second frame rate by a video processing chip, wherein the transport frame stream comprises multiple video frames and at least one invalid frame, wherein a resolution of the multiple video frames and the at least one invalid frame is a second resolution, and wherein the second frame rate is a frame rate agreed upon in advance by the video processing chip and the MEMC chip and the second resolution is a resolution that is agreed upon in advance by the video processing chip and the MEMC chip;
obtain the multiple video frames in the transport frame stream according to an invalidity marker of the at least one invalid frame in the transport frame stream, wherein a frame rate of the multiple video frames is a first frame rate; and
perform motion estimation or motion compensation on the multiple video frames of the first frame rate to generate a display frame stream of a third frame rate, wherein the third frame rate satisfies a refresh rate for a display screen to display the display frame stream, and wherein the third frame rate is higher than the first frame rate.

13. The MEMC chip according to claim 12, wherein the instructions further comprise instructions to:
receive agreement information sent by the video processing chip, wherein the agreement information comprises the second frame rate, the second resolution, and location information, wherein the location information indicates a location of a first pixel region containing pixels of the multiple video frames at a first resolution in a second pixel region containing pixels of the multiple video frames at the second resolution, wherein the first resolution is an original resolution of each video frame, and wherein the second resolution is higher than the first resolution.

14. The MEMC chip according to claim 13, wherein the instructions further comprise instructions to:
obtain the first pixel region from the second pixel region according to the location information;
increase a resolution of the multiple video frames in the display frame stream to a third resolution, to form a resolution-increased display frame stream; and
send the resolution-increased display frame stream to a second video output interface, wherein the third resolution is a resolution of the display screen, and wherein the third resolution is higher than the first resolution.

15. The MEMC chip according to claim 14, wherein the instructions further comprise instructions to:
send the resolution-increased display frame stream to the display screen.

16. A terminal device, comprising:
a video processing chip, configured to:
obtain multiple video frames, wherein a frame rate of the multiple video frames is a first frame rate, wherein a resolution of the multiple video frames is a first resolution, and wherein the first resolution is an original resolution of the multiple video frames;

adjust the multiple video frames from the first resolution to a second resolution, wherein the second resolution is a resolution agreed upon in advance by the video processing chip and a Motion Estimation/Motion Compensation (MEMC) chip, and wherein the second resolution is higher than the first resolution;

generate at least one invalid frame;

set an invalidity marker for the at least one invalid frame, wherein the invalidity marker marks the at least one invalid frame;

insert, according to a second frame rate, the at least one invalid frame into the multiple video frames, causing a frame rate of a transport frame stream containing the multiple video frames and the at least one invalid frame to be the second frame rate, wherein the second frame rate is a frame rate agreed upon in advance by the video processing chip and the MEMC chip, and wherein a resolution of the at least one invalid frame is the second resolution; and send the transport frame stream to the MEMC chip;

the MEMC chip, configured to:

receive the transport frame stream sent at the second frame rate by the video processing chip;

obtain the multiple video frames in the transport frame stream according to the invalidity marker of the at least one invalid frame in the transport frame stream, wherein a frame rate of the obtained multiple video frames is the first frame rate;

perform motion estimation or motion compensation on the multiple video frames of the first frame rate, to generate a display frame stream of a third frame rate, wherein the third frame rate satisfies a refresh rate for a display screen to display the display frame stream, and wherein the third frame rate is higher than the first frame rate; and send the display frame stream to the display screen; and the display screen, configured to receive and display the display frame stream sent by the MEMC chip.

17. The terminal device according to claim 16, wherein the MEMC chip is further configured to receive agreement information sent by the video processing chip, wherein the agreement information comprises the second frame rate, the second resolution, and location information, wherein the location information indicates a location of a first pixel region containing pixels of the multiple video frames at a first resolution in a second pixel region containing pixels of the multiple video frames at the second resolution, wherein the first resolution is an original resolution of each video frame, and wherein the second resolution is higher than the first resolution.

* * * * *

UNITED STATES PATENT AND TRADEMARK OFFICE
CERTIFICATE OF CORRECTION

PATENT NO. : 10,536,730 B2
APPLICATION NO. : 15/640658
DATED : January 14, 2020
INVENTOR(S) : Lijuan Tan It is certified that error appears in the above-identified patent and that said Letters Patent is hereby corrected as shown below:

In the Claims

In Column 19, Line 53, Claim 9, delete "Performing" and insert --performing--.

Signed and Sealed this
Eighteenth Day of August, 2020

Andrei Iancu
*Director of the United States Patent and Trademark Office*